(12) United States Patent
Ahmad et al.

(10) Patent No.: US 6,637,205 B1
(45) Date of Patent: Oct. 28, 2003

(54) ELECTRIC ASSIST AND VARIABLE GEOMETRY TURBOCHARGER

(75) Inventors: Samir S. Ahmad, Rancho Palos Verdes, CA (US); Steven Don Arnold, Rancho Palos Verdes, CA (US); Gary D. Vrbas, Wilmington, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/209,505

(22) Filed: Jul. 30, 2002

(51) Int. Cl.$^7$ .......................... F02D 23/00; F02B 33/44
(52) U.S. Cl. ........................ 60/608; 60/607; 60/611
(58) Field of Search ................ 60/605.1, 607, 60/608, 611

(56) References Cited

U.S. PATENT DOCUMENTS

| | | | |
|---|---|---|---|
| 5,560,208 A | * 10/1996 | Halimi et al. ............... | 60/608 |
| 6,058,707 A | 5/2000 | Bischoff | |
| 6,067,798 A | 5/2000 | Okada et al. | |
| 6,067,799 A | 5/2000 | Heinitz et al. | |
| 6,089,018 A | 7/2000 | Bischoff et al. | |
| 6,134,888 A | 10/2000 | Zimmer et al. | |
| 6,134,890 A | 10/2000 | Church et al. | |
| 6,161,384 A | 12/2000 | Reinbold et al. | |
| 6,233,934 B1 | 5/2001 | Church et al. | |
| 6,256,993 B1 | 7/2001 | Halimi et al. | |
| 6,272,859 B1 | 8/2001 | Barnes et al. | |
| 6,314,736 B1 | 11/2001 | Daudel et al. | |
| 6,338,250 B1 | 1/2002 | Mackay | |
| 6,397,597 B1 | 6/2002 | Gartner | |

* cited by examiner

Primary Examiner—Sheldon J. Richter
(74) Attorney, Agent, or Firm—Ephraim Starr; Brian Pangule (57) ABSTRACT

Methods, devices, and/or systems for controlling intake to and/or exhaust from an internal combustion engine. An exemplary method for controlling intake charge pressure to an internal combustion engine includes determining one or more control parameters based at least partially on an intake charge target pressure; and outputting the one or more control parameters to control an electric motor operatively coupled to a compressor capable of boosting intake charge pressure and to control a variable geometry actuator capable of adjusting exhaust flow to a turbine.

44 Claims, 12 Drawing Sheets

ELECTRIC ASSIST AND VARIABLE GEOMETRY TURBOCHARGER

TECHNICAL FIELD

This invention relates generally to methods, devices, and/or systems for controlling intake to and/or exhaust from an internal combustion engine.

BACKGROUND

Methods, devices and/or systems that boost intake charge pressure (e.g., defined as force per unit area or energy per unit volume) often extract energy mechanically from a rotating shaft powered by combustion. For example, a turbocharger typically includes a compressor and a turbine attached to a shaft wherein the turbine extracts energy from exhaust, which causes rotation of the shaft, and, consequently, a boost in intake charge pressure (e.g., intake air pressure) by the compressor. As another example, consider a supercharger, which boosts intake charge pressure using a compressor powered by energy extracted from a drive shaft or the like.

Recently, a variety of variable geometry turbochargers (VGTs), that aim to address boost issues, have become available. VGTs, such as, but not limited to, the GARRETT® VNT™ and AVNT™ turbochargers (Garrett Corporation, California), use adjustable vanes, nozzles or the like, to control exhaust flow across a turbine. For example, GARRETT® VNT™ turbochargers adjust the exhaust flow at the inlet of a turbine in order to optimize turbine power with the required load. Movement of vanes towards a closed position typically directs exhaust flow more tangentially to the turbine, which, in turn, imparts more energy to the turbine and, consequently, increases compressor boost. Conversely, movement of vanes towards an open position typically directs exhaust flow more radially to the turbine, which, in turn, reduces energy to the turbine and, consequently, decreases compressor boost. Thus, at low engine speed and small exhaust gas flow, a VGT turbocharger may increase turbine power and boost pressure; whereas, at full engine speed/load and high gas flow, a VGT turbocharger may help avoid turbocharger overspeed and help maintain a suitable or a required boost pressure.

A variety of control schemes exist for controlling geometry, for example, an actuator tied to compressor pressure may control geometry and/or an engine management system may control geometry using a vacuum actuator. Overall, a VGT may allow for boost pressure regulation which may effectively optimize power output, fuel efficiency, emissions, response and/or wear. Of course, a turbocharger may employ wastegate technology as an alternative or in addition to aforementioned variable geometry technologies.

Methods, devices and/or systems having functionality, for example, of the aforementioned commercially available devices, and/or other functionality, are described below.

BRIEF DESCRIPTION OF THE DRAWINGS

A more complete understanding of the various method, systems and/or arrangements described herein, and equivalents thereof, may be had by reference to the following detailed description when taken in conjunction with the accompanying drawings wherein.

DETAILED DESCRIPTION

Turning to the drawings, wherein like reference numerals refer to like elements, various methods are illustrated as being implemented in a suitable control and/or computing environment. Although not required, various exemplary methods are described in the general context of computer-executable instructions, such as program modules, being executed by a computer and/or other computing device. Generally, program modules include routines, programs, objects, components, data structures, etc. that perform particular tasks or implement particular abstract data types.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks. In addition, various diagrams include individual "blocks" that are optionally structural elements of a device and/or a system. For example, a "controller block" optionally includes a controller as a structural element, an "actuator block" optionally includes an actuator as a structural element, a "turbocharger block" optionally includes a turbocharger as a structural element, etc. In various blocks, structure and function are implied. For example, a controller block optionally includes a controller (e.g., a structure) for controlling boost (e.g., a function).

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Figure 1:
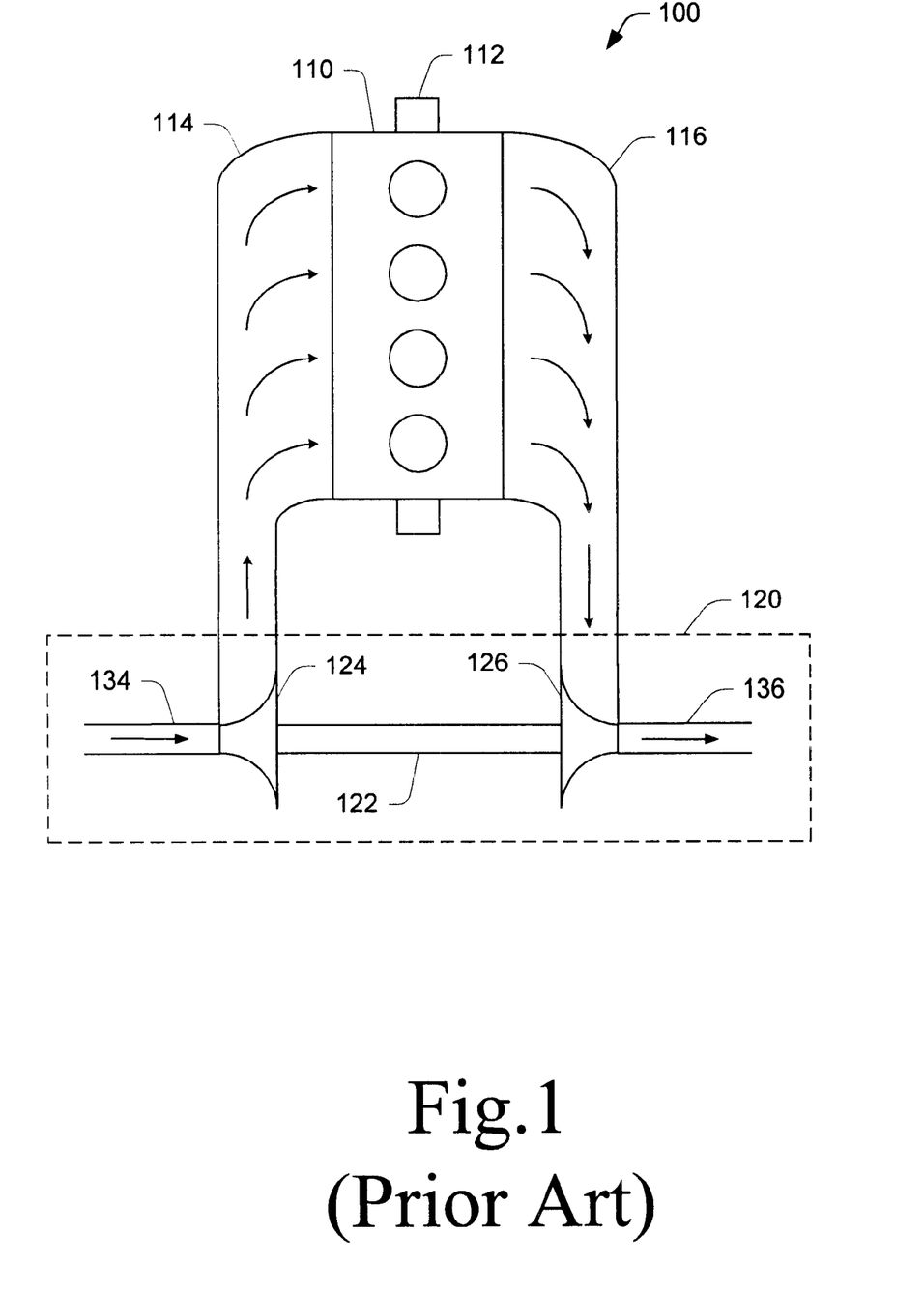
FIG. 1 is a simplified approximate diagram illustrating a turbocharger and an internal combustion engine.

Turbochargers are frequently utilized to increase the output of an internal combustion engine. Referring to FIG. 1, an exemplary system 100, including an exemplary internal combustion engine 110 and an exemplary turbocharger 120, is shown. The internal combustion engine 110 includes an engine block 118 housing one or more combustion chambers that operatively drive a shaft 112. As shown in FIG. 1, an intake port 114 provides a flow path for combustion gas (e.g., air) to the engine block 118 while an exhaust port 116 provides a flow path for exhaust from the engine block 118.

The exemplary turbocharger 120 acts to extract energy from the exhaust and to use this energy to boost intake charge pressure (e.g., pressure of combustion gas). As shown in FIG. 1, the turbocharger 120 includes a shaft 122 having a compressor 124, a turbine 126, an intake 134, and an exhaust outlet 136. Exhaust from the engine 110 diverted to the turbine 126 causes the shaft 122 to rotate, which, in turn, rotates the compressor 124. When rotating, the compressor 124 energizes combustion gas (e.g., ambient air) to produces a "boost" in combustion gas pressure (e.g., force per unit area or energy per unit volume), which is commonly referred to as "boost pressure." In this manner, a turbocharger may help to provide a larger mass of combustion gas (typically mixed with a carbon-based and/or hydrogen-based fuel) to the engine, which translates to greater engine output during combustion.

Figure 2:
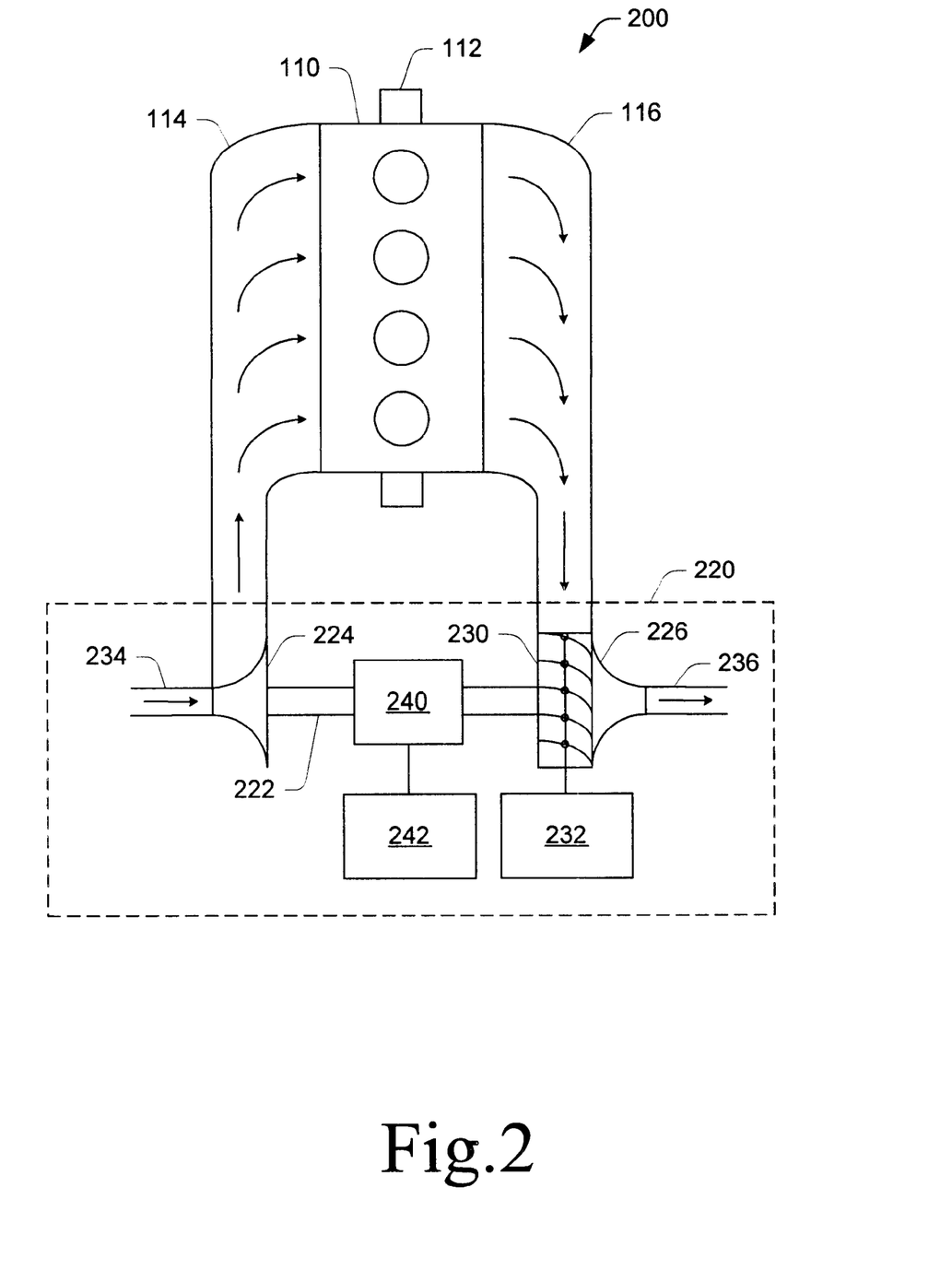
FIG. 2 is a simplified approximate diagram illustrating an electric assist unit, a variable geometry unit, a turbocharger and an internal combustion engine.

Referring to FIG. 2, an exemplary system 200, including another exemplary turbocharger 220 and an exemplary internal combustion engine 110 (see the engine 110 of FIG. 1), is shown. The exemplary turbocharger 220 includes a combustion gas inlet 234, a shaft 222, a compressor 224, a turbine 226, a variable geometry unit 230, a variable geometry actuator 232, an exhaust outlet 236, an electric assist unit 240 and a power electronics unit 242. The variable geometry unit 230 and/or variable geometry actuator 232 optionally has features such as those associated with commercially available variable geometry turbochargers (VGTs), such as, but not limited to, the GARRETT® VNT™ and AVNT™ turbochargers, which use multiple adjustable vanes to control the flow of exhaust through a nozzle and across a turbine. As shown, the variable geometry unit 230 is optionally positioned at, or proximate to, an exhaust inlet to the turbine 226. The electric assist unit 240 and/or the power electronics unit 242 optionally include an electric motor and/or generator and associated power electronics capable of accelerating and/or decelerating a shaft (e.g., compressor shaft, turbine shaft, etc.). The power electronics unit 242 optionally operates on DC power and generates an AC signal to drive the electric assist unit 240 (e.g., a motor and/or generator). The electric assist unit 240 and/or the power electronics unit 242 may also have an ability to rectify AC power to thereby output DC power.

Figure 3:
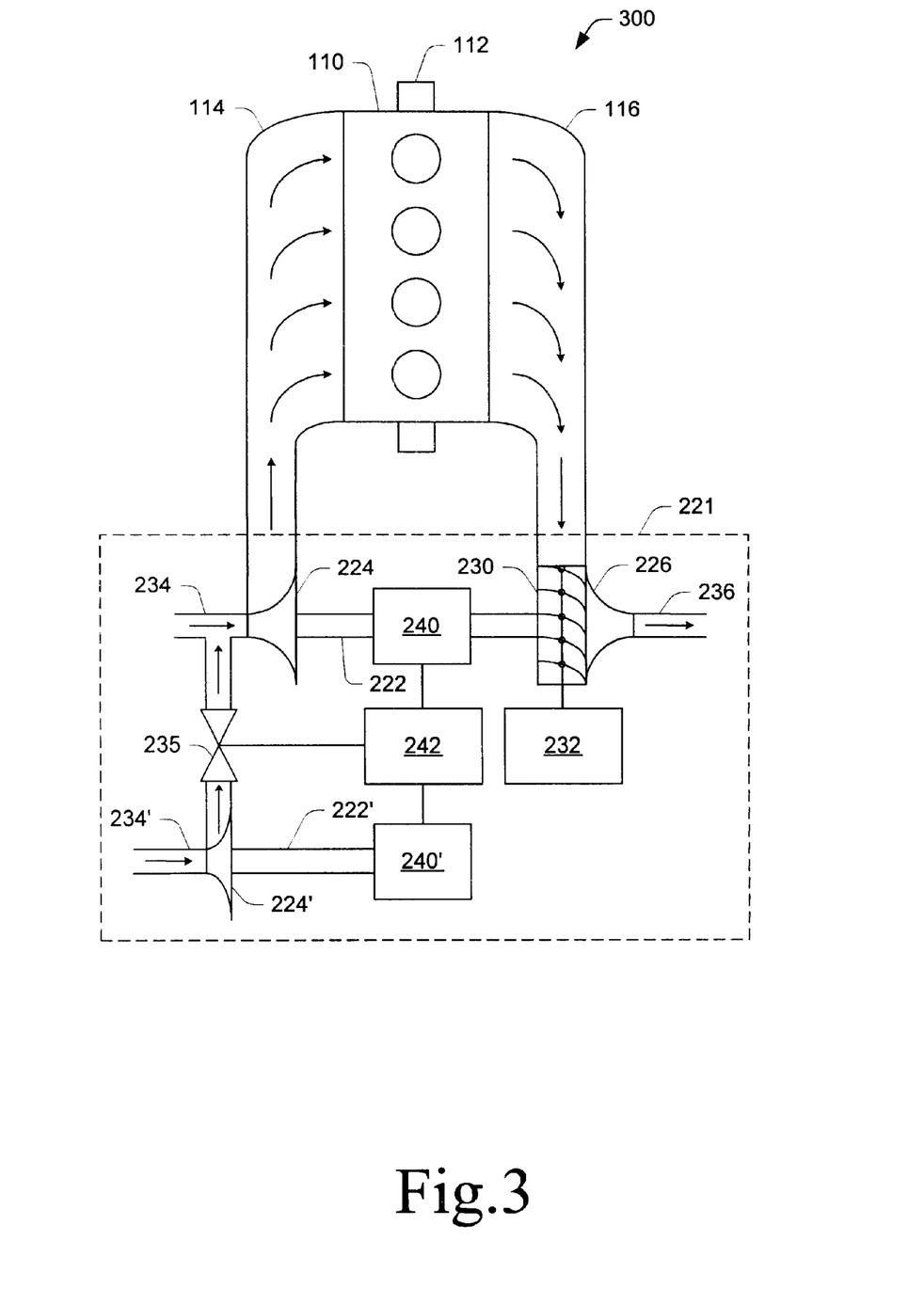
FIG. 3 is a simplified approximate diagram illustrating multiple electric assist units, a variable geometry unit, a turbocharger and an internal combustion engine.

Referring to FIG. 3 an exemplary system 300 is shown that includes another exemplary turbocharger 221 and an exemplary internal combustion engine 110 (see the engine 110 of FIG. 1). The exemplary turbocharger 221 includes an optionally multistage compressor system. The exemplary turbocharger 221 includes a first combustion gas inlet 234, a second combustion gas inlet 234', a first shaft 222, a second shaft 222', a first compressor 224, a second compressor 224', a turbine 226, a variable geometry unit 230, a variable geometry actuator 232, an exhaust outlet 236, a first electric assist unit 240, a second electric assist unit 240' and a power electronics unit 242.

The second compressor 224' has an outlet that optionally feeds to the inlet 234 of the first compressor 224 and/or to the inlet port 114 of the engine 110. As shown, a valve 235 controls flow between the second compressor 224' and the first compressor 224. The power electronics unit 242, an electric assist unit (e.g., units 240, 240') and/or another unit optionally controls the valve 235. According to such an exemplary system 221, one or more turbines (e.g., such as, the turbine 226) and one or more electric assist units (e.g., such as, the electric assist unit 240) extract energy from an exhaust (e.g., from the exhaust port 116). The extracted energy is optionally stored and/or used to power one or more compressors (e.g., the compressors 224, 224'). While the exemplary system having two compressors shown in FIG. 3 has two compressors in series, alternative arrangements are also possible (e.g., series, parallel, etc.). For example, but not limited to, an arrangement having two or more compressors wherein each compressor has an associated turbine.

The electric assist units 240, 240' have one or more links to one or more power electronics units (e.g., the power electronics unit 242). The electric assist units 240, 240' and/or power electronics unit 242 optionally include an electric motor and/or generator and associated power electronics capable of accelerating and/or decelerating a shaft (e.g., compressor shaft, turbine shaft, etc.). The power electronics unit 242 optionally operates on DC power and generates an AC signal to drive the electric assist units 240, 240' (e.g., a motor and/or generator). Of course, use of a DC motor or electric assist unit is also possible. The electric assist units 240, 240' and/or the power electronics unit 242 may also have an ability to rectify AC power to thereby output DC power.

Figure 4:
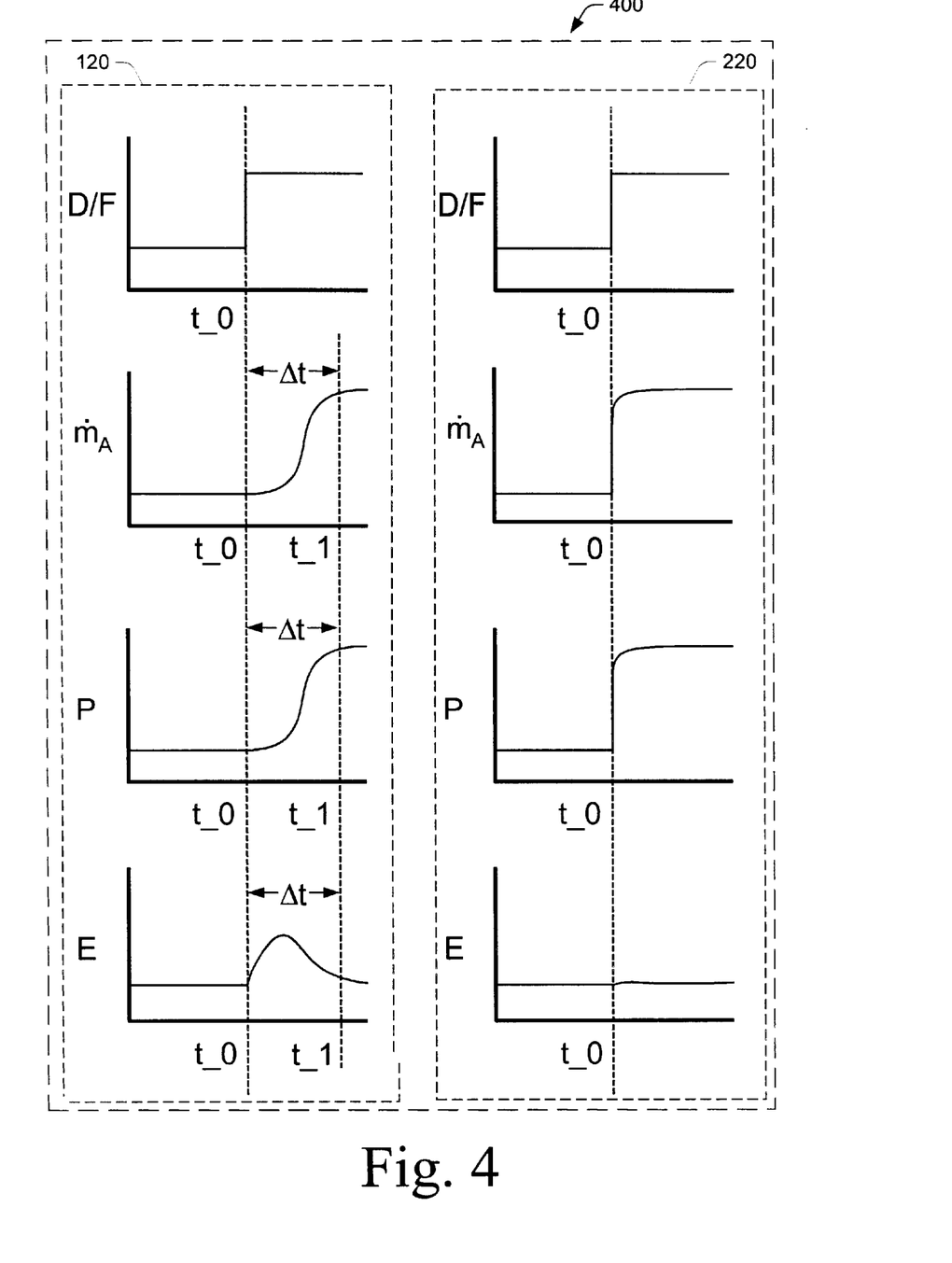
FIG. 4 is a simplified approximate graphical diagram illustrating exemplary behavior of the turbocharger and the internal combustion engine of FIG. 1 and the exemplary boost/generation systems and the internal combustion engines of FIG. 2 and/or FIG. 3.

Various exemplary methods, devices and/or systems disclosed herein optionally operate to enhance performance of an internal combustion engine. Performance includes, for example, power, efficiency, emissions, etc. Referring to FIG. 4, exemplary simplified, approximate graphs are shown for the turbocharger 120 of FIG. 1 and for the exemplary system 220 of FIG. 2 (or the exemplary system 221 of FIG. 3). One set of graphs labeled 120 is associated with the turbocharger 120 of FIG. 1 while another set of graphs labeled 220 is associated with the exemplary system 220 of FIG. 2 (or the exemplary system 221 of FIG. 3).

Referring to the set of graphs 120, graphs for power demand and/or fuel flow with respect to time, airflow with respect to time, engine power with respect to time and emissions with respect to time are shown. Referring to the graph for demand and/or fuel flow (D/F) with respect to time, at a time of approximately $t\_0$, demand and/or fuel flow increases. In response to the increase in demand and/or fuel flow, airflow (e.g., $\dot{m}_A$ or mass air flow) increases, leveling off at a time of approximately $t\_1$. In this example, an air flow time delay ($\Delta t_A$) exists between the time $t\_0$ and the time $t\_1$. Similarly, a time delay exists in engine power ($\Delta t_P$) and potentially in emissions ($\Delta t_E$). In turbocharged engines, such delays are often characterized as "turbo lag". Various exemplary methods, devices and/or systems described herein, and/or equivalents thereof, operate to reduce such time delays.

Referring to the set of graphs 220, an increase in demand and/or fuel flow occurs at a time of approximately $t\_0$. In response to the increase in demand and/or fuel flow, an electric assist unit (e.g., the electric assist unit 240 of FIG. 2), provides power to a shaft (e.g., the shaft 222 of FIG. 2) associated with a compressor (e.g., the compressor 224 of FIG. 2) and a turbine (e.g., the turbine 226 of FIG. 2). In turn, the electric assist unit drives the shaft and hence the compressor to thereby boost intake charge pressure and mass air flow to an internal combustion engine (e.g., internal combustion engine 110 of FIG. 2). Note that in the graph of air flow ($\dot{m}_A$) with respect to time, the air flow increases spontaneously or nearly spontaneously at approximately time $t\_0$. Thus, the exemplary system reduces and/or substantially eliminates the delay time associated with the turbocharger 120. Further note that similar behavior is shown in the graph of power (P) versus time. In addition, corresponding emissions (E) are potentially reduced in response to the increase in demand and/or fuel flow (D/F).

Figure 5:
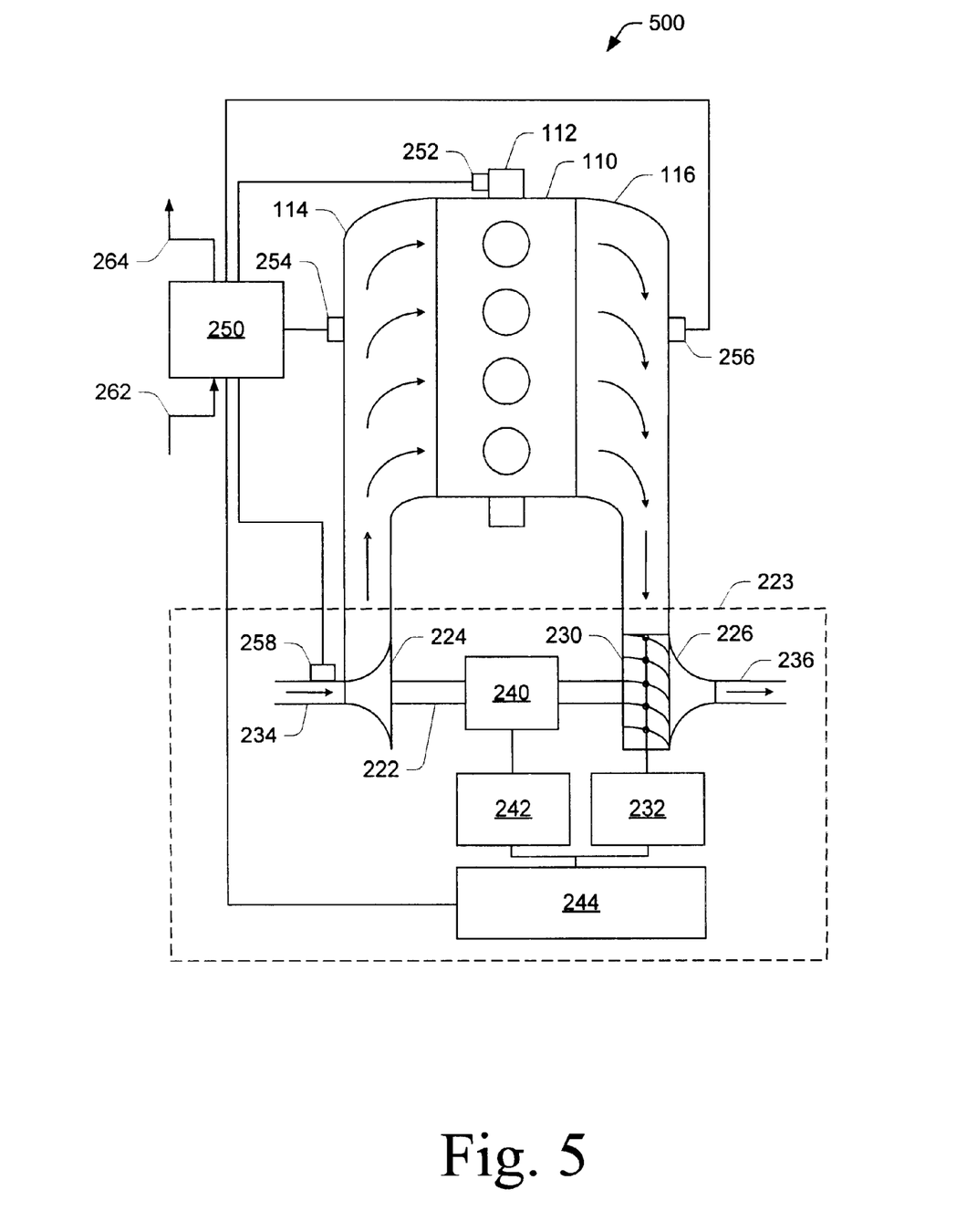
FIG. 5 is an approximate diagram illustrating the system of FIG. 2 and additional control features.

Referring to FIG. 5, an exemplary control system 400, including a turbocharger system 223 that includes various components of the exemplary system 220 of FIG. 2 and various components of one or more exemplary controllers 244, 250, is shown. The controller 244 includes communication links to the power electronics unit 242 and the variable geometry actuator 232 and typically includes control logic (e.g., microprocessor-based controller, etc.) to provide for general control of intake and/or exhaust pressure, temperature, flow, etc. The controller 244 also includes another link to the controller 250, which typically provides general control for the internal combustion engine 110. The controller 250 includes links to various sensors, such as, but not limited to, an engine speed sensor 252, a post-compressor intake pressure, temperature, and/or flow sensor; an exhaust pressure, temperature, and/or flow sensor 256, and a pre-compressor intake pressure, temperature, and/or flow sensor 258. Through use of such sensors, various parameters are determinable, such as, but not limited to, boost pressure, backpressure, etc.

Additional links 262, 264 are also shown to and from the controller 250. The link 262 optionally provides operator and/or other input to the controller 250 while the link 264 optionally provides control information for the internal combustion engine 110 (e.g., fuel flow, etc.).

Figure 6:
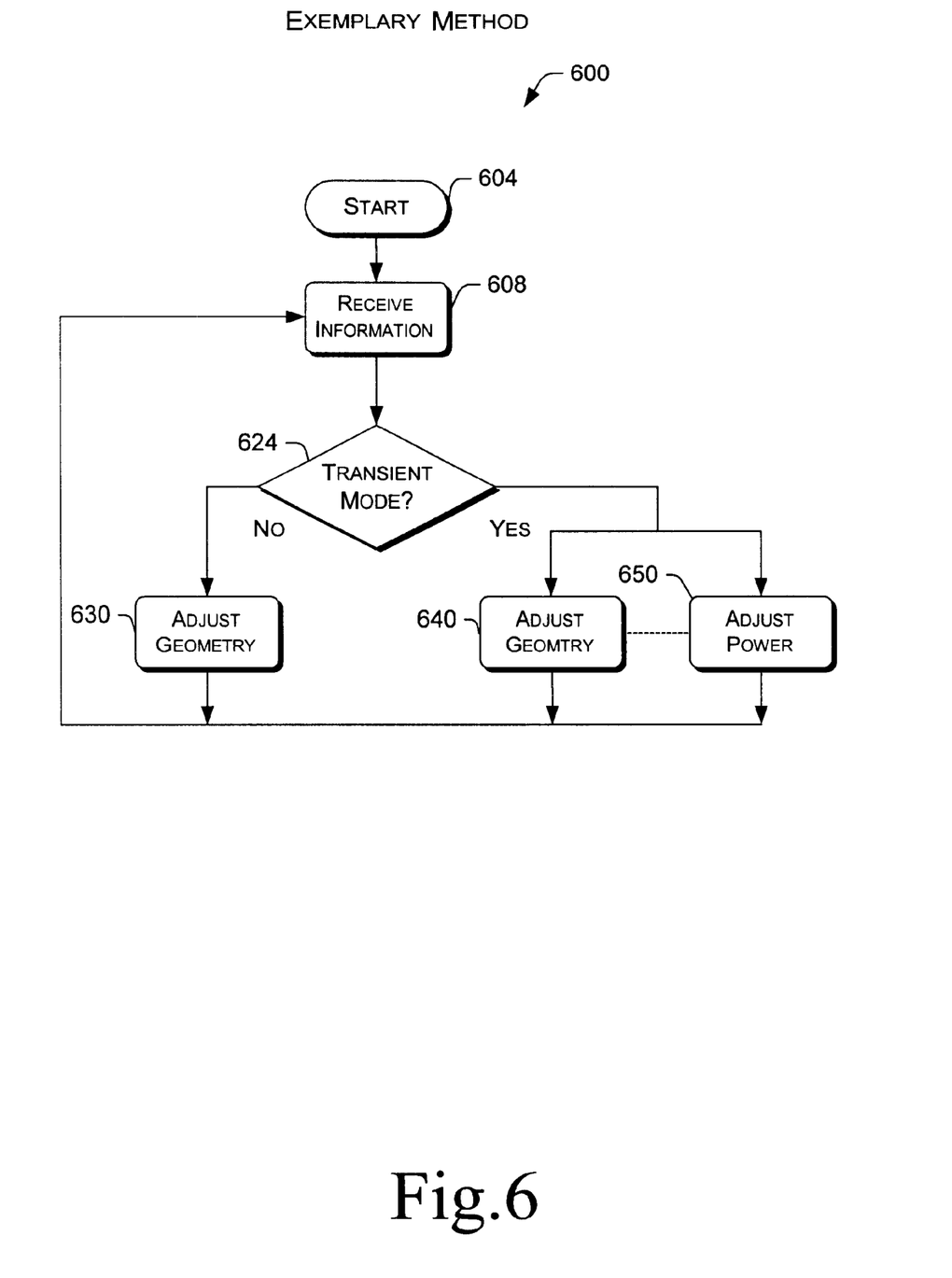
FIG. 6 is a block diagram illustrating an exemplary method suitable for use during transient operation of an internal combustion engine.

Referring to FIG. 6, an exemplary method 600 for controlling, for example, the exemplary system 223 of FIG. 5, is shown. In a start block 604, the method 600 commences. A reception block 608 follows, wherein a controller receives and/or otherwise determines information relevant to control. Next, in a decision block 624, the controller determines whether an engine is operating in a transient mode, for example, whether the engine is accelerating, fuel flow is increasing, or an increase in demand is occurring. If the decision block 624 determines that the engine is not in a transient mode, then, in an adjust geometry block 630, an actuator adjusts geometry of a variable geometry unit if necessary. However, if the decision block 624 determines that the engine is in a transient mode, then, in a geometry adjustment block 640 and a power adjustment block 650, a power electronics unit and a variable geometry actuator adjust power to an electric assist unit (e.g., a motor and/or generator) and/or adjust geometry of a variable geometry unit (e.g., a VGT, nozzle, vanes, etc.). The power electronics unit and the variable geometry actuator optionally include a link as indicated by the dashed line between the geometry adjustment block 640 and the power adjustment block 650. Following any of the adjustment blocks 630, 640, 650, the exemplary method 600 typically continues at the reception block 608.

Figure 7:
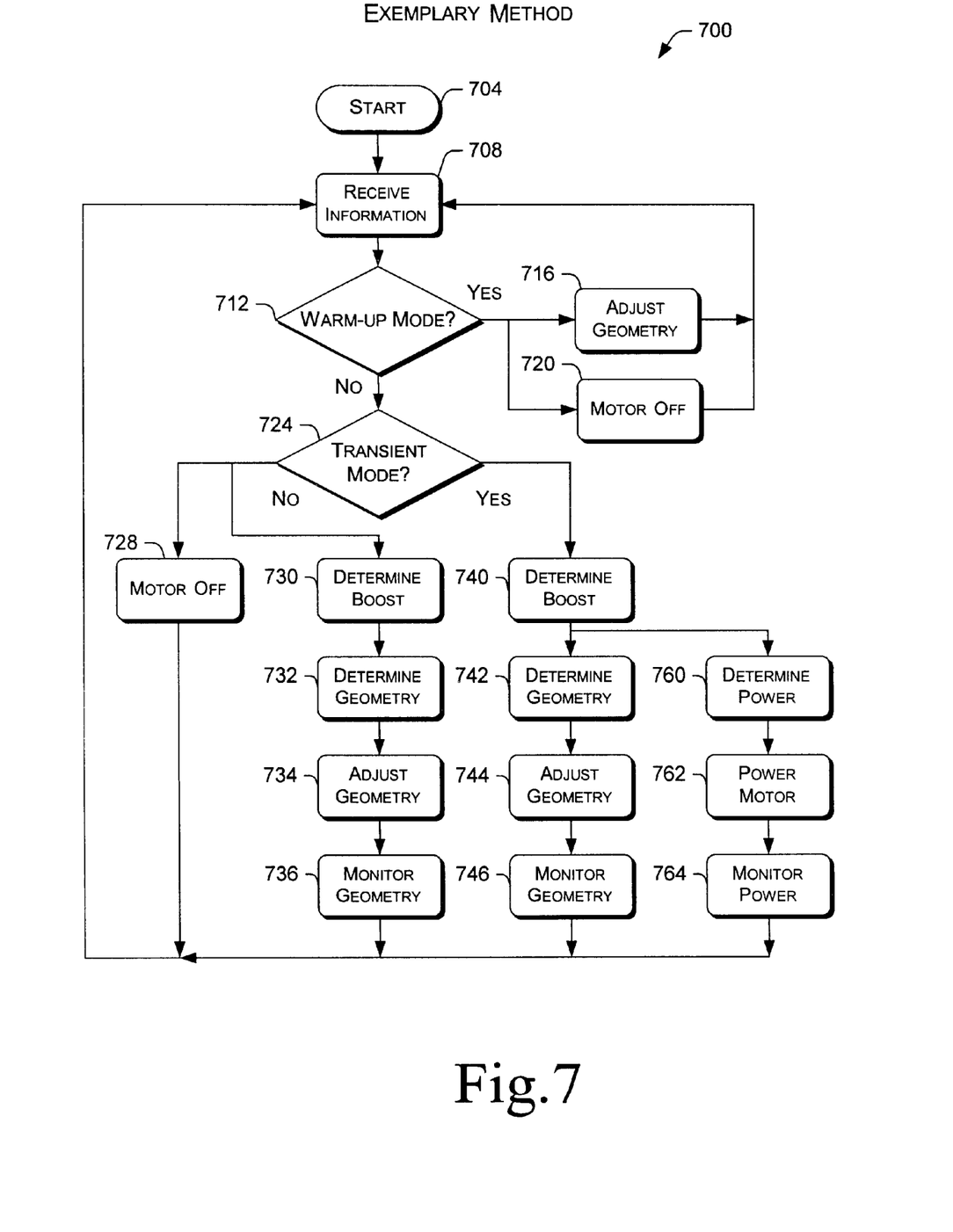
FIG. 7 is a block diagram illustrating an exemplary method suitable for use during warm-up and/or transient operation of an internal combustion engine having an exemplary boost/generation system.

Referring to FIG. 7, an exemplary method 700 for controlling, for example, the exemplary system 223 of FIG. 5, is shown. In a start block 704, the method commences. A reception block 708 follows, wherein a controller receives and/or otherwise determines information relevant to control. Next, in a decision block 712, the controller determines whether an engine is in a warm-up mode. If the decision block 712 determines that the engine is warming-up, then a geometry adjustment block 716 follows, wherein an actuator adjusts geometry of a variable geometry unit (e.g., VGT, nozzle(s), vane(s), etc.), if necessary. A motor "off" block 720 also follows, wherein power to the electric assist unit (e.g., motor and/or generator) is switched off, if not already off. In this case, the exemplary method 700 continues at the reception block 708.

In the case that the decision block 712 determines that the engine is not in a warm-up mode, then another decision block 724 follows, which determines whether the engine is operating in a transient mode, for example, whether the engine is accelerating, fuel flow is increasing and/or an increase in demand is occurring. Of course, appropriate control is optionally provided for deceleration as well. If the decision block 724 determines that the engine is not in a transient mode, then, in a motor "off" block 728, power to the electric assist unit (e.g., motor and/or generator) is switched off, if not already off and, in boost determination block 730, a controller determines a desirable boost level. After determination of boost level, a geometry determination block 732 follows, wherein a controller determines a desirable geometry. Next, in an adjust geometry block 734, an actuator adjusts a variable geometry unit (e.g., VGT, nozzle(s), vane(s), etc.) to effectuate the desirable geometry. Such control may achieve the desirable boost level; however, if not, a monitor block 736 optionally further adjusts geometry to, for example, trim the boost. An exemplary monitor block optionally uses PID control or other suitable control logic, for example, to minimize error between a desirable boost level and an actual boost level.

In the case that the decision block 724 determines that the engine is in a transient mode, then in a boost determination block 740, a controller determines a desirable boost level. After determination of boost level, a geometry determination block 742 and a power determination block 760 follow, wherein one or more controllers determine a desirable geometry for a variable geometry unit (e.g., VGT, nozzle(s), vane(s), etc.) and/or a desirable power level for an electric assist unit (e.g., motor and/or generator). Next, in an adjust geometry block 744 and in a power motor block 762, actuators adjust the variable geometry unit (e.g., VGT, nozzle(s), vane(s), etc.) and/or the electric assist unit (e.g., motor and/or generator) to effectuate the desirable geometry and/or the desirable power. Such control may achieve the desirable boost level; however, if not, a monitor geometry block 746 optionally further adjusts geometry to trim the boost. An exemplary monitor geometry block optionally uses PID control or other suitable control logic, for example, to minimize error between a desirable boost level and an actual boost level.

In addition, in a monitor power block 764, a controller optionally monitors and/or adjusts power to the electric assist unit (e.g., motor and/or generator), for example, after evaluation of a motor operation function, template, etc. (e.g., see the exemplary motor operation function of FIG. 10).

Following the various control blocks 728, 736, 746, 764, the exemplary method optionally terminates or continues at the reception block 708, as shown, or at the decision block 712 or at the decision block 724.

Figure 8:
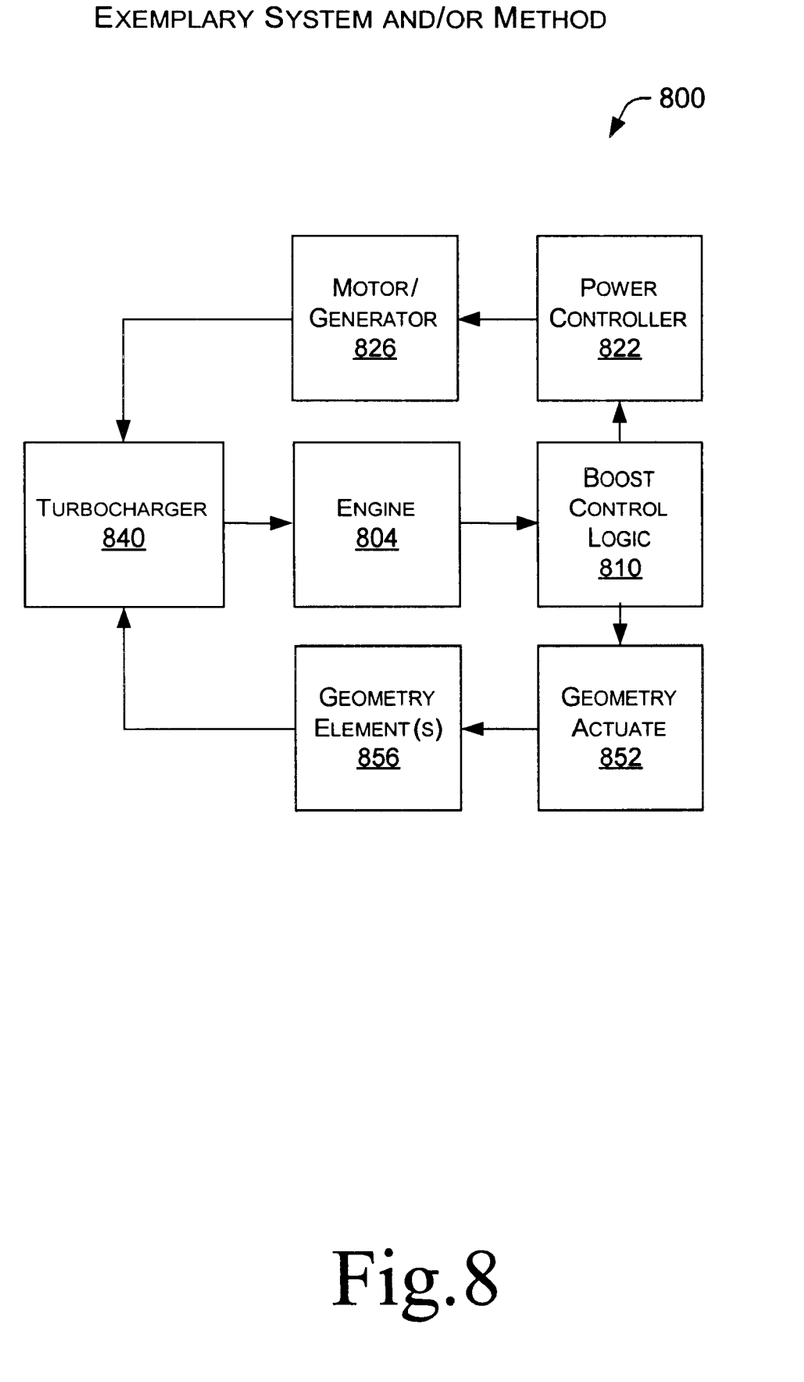
FIG. 8 is a block diagram illustrating an exemplary system and/or method for controlling intake to and/or exhaust from an engine.

Referring to FIG. 8, an exemplary system and/or method 800 for controlling intake and/or exhaust is shown. An engine block 804 provides, via sensors or other means, information to a boost control logic block 810. The boost control logic block 810 determines a desirable boost (e.g., an intake charge target pressure, mass air flow, etc.) based at least in part on the information received from the engine block 804. The boost control logic block 810 then outputs information to a power controller block 822 and/or a variable geometry actuate block 852. For example, the control logic block 810 optionally uses control logic to determine one or more control parameters based at least partially on a intake charge target pressure (e.g., a desirable boost, mass air flow, etc.) and then outputs the one or more control parameters to control an electric motor operatively coupled to a compressor capable of boosting intake charge pressure and to control a variable geometry actuator capable of adjusting exhaust flow to a turbine. Accordingly, an exemplary method includes determining one or more control parameters based at least partially on an intake charge target pressure; and outputting the one or more control parameters to control an electric motor operatively coupled to a compressor capable of boosting intake charge pressure and to control a variable geometry actuator capable of adjusting exhaust flow to a turbine.

As shown in FIG. 8, the power controller block 822 commands a power controller to provide, for example, a desirable power level to an electric assist unit (e.g., motor and/or generator). In a motor and/or generator block 826, an electric motor associated with the electric assist unit receives the desirable power level and provides power to a turbocharger block 840, which includes a turbocharger such as, for example, the turbocharger shown in the system 220 of FIG. 2. The variable geometry actuate block 852 commands an actuator to adjust, for example, a variable geometry unit (e.g., VGT, nozzle(s), vane(s), etc.) to a desirable geometry. In a variable geometry block 856, a variable geometry element or elements associated with the variable geometry unit adjust to the desirable geometry, which, in turn, effects operation of the turbocharger block 840. Operation of the turbocharger block 840 further effects operation of the engine block 804, thereby forming a closed-loop control system and/or method.

Figure 9:
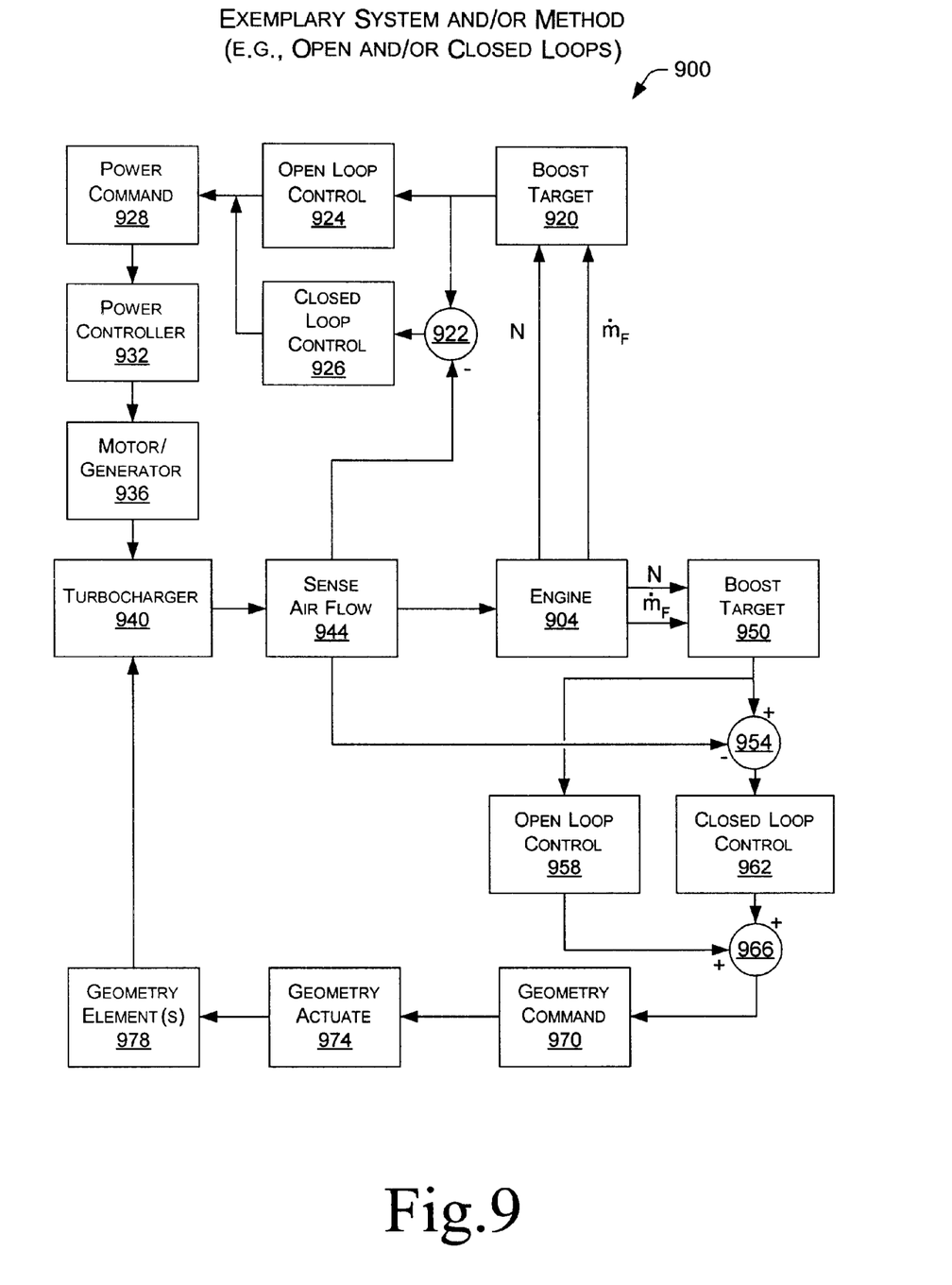
FIG. 9 is a block diagram illustrating an exemplary system and/or method for controlling intake to and/or exhaust from an engine using closed-loop and/or open-loop control.

Referring to FIG. 9, an exemplary system and/or method 900 for controlling intake and/or exhaust is shown. An engine block 904 provides information pertaining to speed (N) and/or fuel (e.g., $\dot{m}_F$ or mass fuel flow, percentage load) to a boost target determination block 920 associated with an electric assist unit and/or to a boost target determination block 950 associated with a variable geometry unit 950. An electric assist boost target block 920 uses at least part of the information to determine a desirable (or target) electric assist boost and a variable geometry boost target block 950 uses at least part of the information to determine a desirable (or target) variable geometry boost.

The electric assist boost target block 920 transmits the desired or target electric assist boost to a juncture block 922 and/or an open-loop control block 924 to aid in the determination of a control path for achieving the desired or target electric assist boost (or optionally power generation). The juncture block 922 optionally receives information from a sense block 944 that, for example, senses air flow to and/or from the engine (e.g., typically air flow to the engine). The juncture block 922 also has a link to a closed-loop control block 926 to aid in the determination of a control path for achieving the desired or target electric assist boost (or optionally power generation). The control blocks 924, 926 optionally determine a control path on the basis of variables such as, but not limited to, magnitude, duration, and ramp-up and/or ramp-down. Further, a motor operation function, look-up table and/or other information is optionally used to determine control. The control blocks 924, 926 output information to a power command block 928. According to this exemplary system and/or method 900, control of an electric assist unit occurs through open-loop, closed-loop and/or a combination of open-loop and closed-loop control.

The power command block 928 determines an appropriate command or commands, based at least in part on output from one or more control blocks 924, 926 for communication to a power controller block 932. The power controller block 932 provides power to a motor and/or generator block 936 according to such command or commands. Of course, an exemplary system optionally has more than one electric assist unit (see, e.g., the turbocharger system 221 of FIG. 3). The motor and/or generator block 936 includes a motor and/or generator operatively coupled to, for example, a turbine, compressor, turbocharger, etc., whereby delivery of power to the motor and/or generator translates into, for example, delivery of power to a turbine and/or a compressor; accordingly, as shown in FIG. 9, the motor and/or generator block 936 operates on a turbocharger block 940.

The turbocharger block 940 typically alters pressure, temperature, and/or mass flow rate of an intake charge (e.g., combustion gas, etc.). The sense air flow block 944 senses air flow (and/or pressure, temperature, etc.) from the turbocharger block 940 and optionally provides such information to the engine block 904 and/or various other blocks (e.g., the juncture block 922, etc.). As shown in FIG. 9, the sense air flow block 944 transmits flow rate and/or pressure, temperature, etc., information (e.g., $\dot{m}_A$, etc.) to the engine block 904, to the juncture block 922, and to a juncture block 954 in a variable geometry control path.

In a similar fashion, the engine block 904 provides information pertaining to speed (N) and/or fuel (e.g., $\dot{m}_F$, percentage load, etc.) to the boost target block 950 associated with variable geometry control. The variable geometry boost target block 950 uses at least part of the information to determine a desirable (or target) variable geometry boost. The variable geometry boost target block 950 transmits the desired or target variable geometry boost to the juncture block 954 and/or to an open-loop variable geometry control block 958. As already mentioned, the juncture block 954 also receives information from the sense block 944, which optionally offsets (wholly or in part) variable geometry boost by sensed turbocharger and/or electric assist boost. For example, the juncture block 954 optionally determines a new desired or target variable geometry boost due on the basis of sensed and/or other information. The juncture block 954 transmits the desired or target variable geometry boost to a closed-loop control block 962. The closed-loop control block 962 uses any of a variety of control algorithms, such as, but not limited to, proportional, integral and/or derivative algorithims, to determine a control path. The closed-loop control block 962 optionally determines the control path on the basis of variables such as, but not limited to, magnitude, duration, and ramp-up and/or ramp-down. Further, a variable geometry operation function, look-up table and/or other information is optionally used to determine control. The closed-loop control block 962 transmits information to another juncture block 966 that optionally receives information from the open-loop control block 958. Of course, open-loop control, as represented by the open-loop control block 958 is optional (as is the associated juncture block 966). Open-loop control may provide for less overshoot, a faster path to a target, and/or otherwise assist closed-loop control. As described herein, the exemplary system and/or method 900 uses closed-loop, open-loop and/or closed-loop and open-loop control.

The juncture block 966 transmits information to a variable geometry command block 970. The variable geometry command block 970 determines an appropriate command or commands, based at least in part on the juncture block 966, for transmission to a variable geometry actuate block 974. The variable geometry actuate block 974 adjusts geometry of a variable geometry element(s) block 978 according to such command or commands. The variable geometry element(s) block 978 includes one or more variable geometry element capable of altering exhaust flow to a turbocharger (e.g., VGT, nozzle(s), vane(s), etc.); accordingly, as shown in FIG. 9, the variable geometry block 978 effects the turbocharger block 940. In turn, the turbocharger block 940 alters pressure, temperature, and/or mass flow rate of combustion gas (e.g., air).

Overall, such an exemplary system and/or method optionally determines the amount of boost or mass airflow needed for steady-state engine operation and/or transient operation. For example, for steady-state operation, control logic may determine an optimal vane position to achieve a desired mass airflow. In addition, a closed-loop coupled with open-loop control is optionally used to regulate vane position by commanding a variable geometry actuator. Further, for transient operation, such an exemplary system and/or method optionally uses open-loop control to determine electrical power needed to accelerate an electric assist unit motor to achieve a desired or target boost or mass airflow. In moving from transient to steady-state operation, a ramp-down or other function is optionally used to help insure a smooth transition between electric assist and variable geometry operations.

Figure 10:
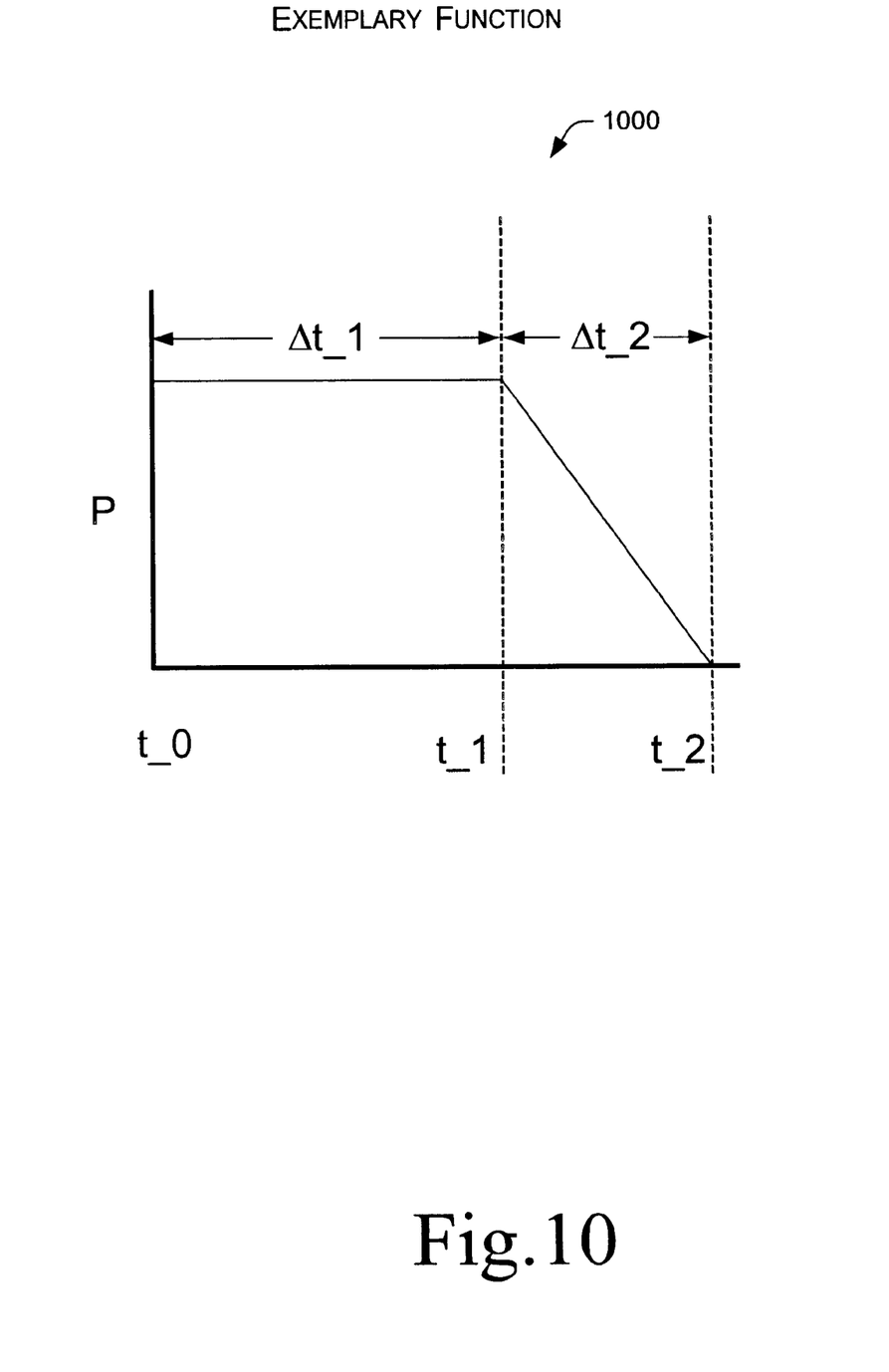
FIG. 10 is a graph illustrating an exemplary motor operation function for use in various exemplary systems and/or methods.

Referring to FIG. 10, a graph 1000 of an exemplary electric assist control algorithm or operation function is shown. Note that between times of approximately t_0 and approximately t_1, power (P) to the electric assist unit (e.g., motor and/or generator) is positive and constant. The constant value is optionally determined through use of time behavior, current boost, etc., or alternatively, the value is set to a maximum value. The time period from t_0 to t_1 (Δt_1) may correspond to a period of acceleration. The time period Δt_1 may also operate as a timer for a constant or a variable time period. As shown in FIG. 10, when the timer expires (e.g., time of t_1) or when the actual boost, engine power, etc. equals or approximates the desirable or target boost, engine power, etc., then a ramp down or decrease of power (P) to the electric assist unit (e.g., motor and/or generator) occurs. Also note that use of a timer may provide a safety mechanism to prevent wear, power supply drain, etc. Again, such an exemplary operation function may help to insure smooth transitions between transient and steady-state operations where electric assist and variable geometry are involved.

Figure 11:
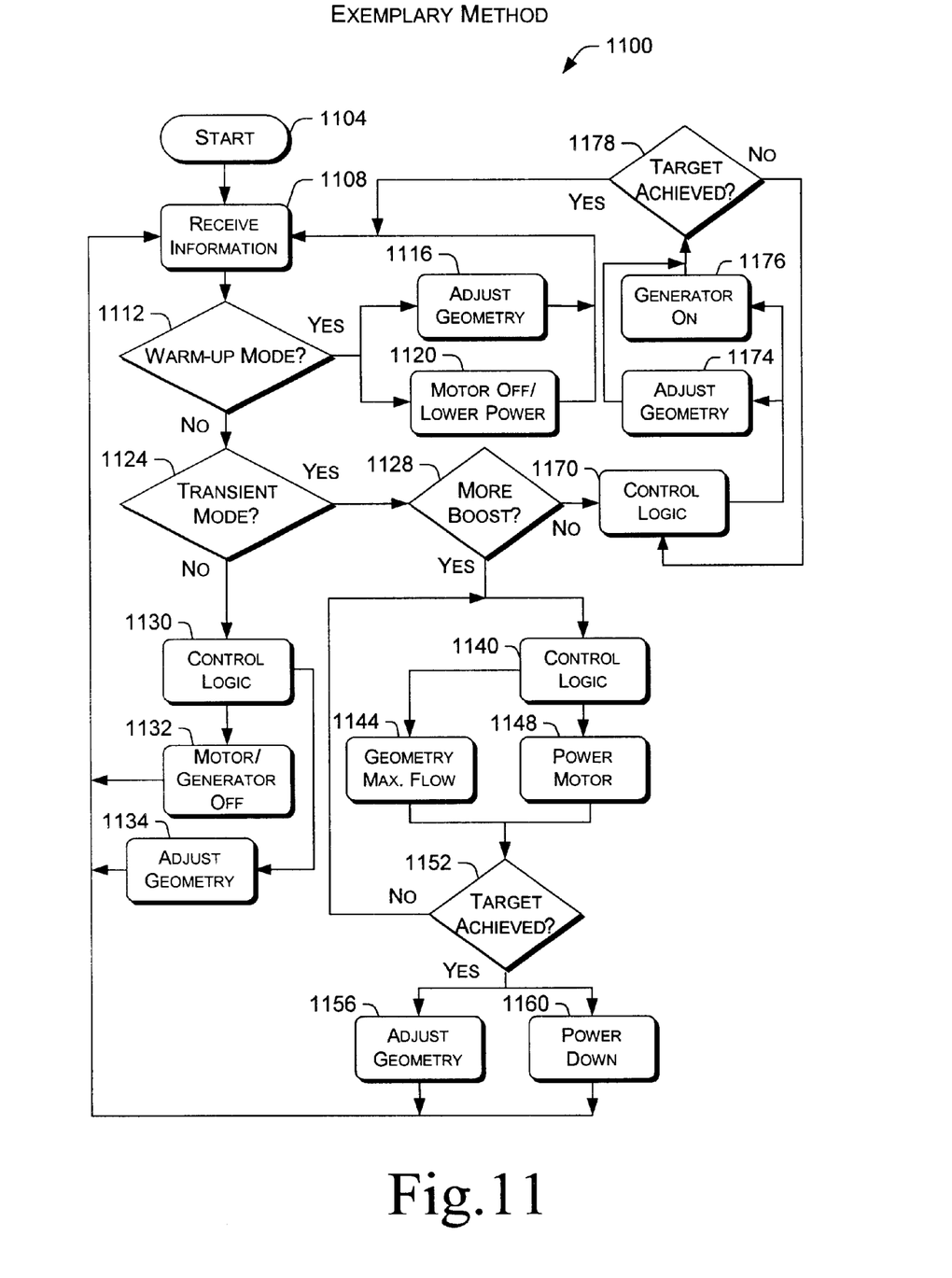
FIG. 11 is a block diagram illustrating an exemplary method suitable for use during warm-up and/or transient operation of an internal combustion engine having an exemplary boost/generation system.

Referring to FIG. 11, an exemplary method 1100 for controlling, for example, an exemplary system (e.g., 220 of FIG. 2, 221 of FIG. 3, 223 of FIG. 5, etc.), is shown. In a start block 1104, the method commences. A reception block 1108 follows, wherein a controller receives and/or otherwise determines information relevant to control. Next, in a decision block 1112, the controller determines whether an engine is in a warm-up mode. If the decision block 1112 determines that the engine is warming-up, then a geometry adjustment block 1116 follows, wherein an actuator adjusts geometry of a variable geometry unit (e.g., VGT, nozzle(s), vane(s), etc.), if necessary. A motor "off" and/or lower power block 1120 also follows, wherein power to the electric assist unit (e.g., motor and/or generator) is switched off, if not already off, or otherwise decreased. In this case, the exemplary method 1100 continues at the reception block 1108, i.e., the geometry block 1116 and the motor block continue at the reception block 1108.

In the case that the decision block 1112 determines that the engine is not in a warm-up mode, then another decision block 1124 follows, which determines whether the engine is operating in a transient mode, for example, whether the engine is accelerating, fuel flow is increasing and/or an increase in demand is occurring. Of course, appropriate control is optionally provided for deceleration as well. If the decision block 1124 determines that the engine is not in a transient mode, then in a control block 1130, appropriate control logic (e.g., PID control and/or monitoring, etc.) determines control for a motor/generator block 1132 and/or an adjust geometry block 1134. The motor/generator block 1132 and the adjust geometry block 1134 act upon an electric assist unit (e.g., motor and/or generator) and an adjustable geometry unit. These two blocks 1132, 1134 typically continue at the reception block 1108.

If the decision block 1124 determines that the engine is in a transient mode, then yet another decision block 1128 determines whether boost is sufficient (e.g., whether more boost is desirable). If the decision block 1128 determines that boost is sufficient and/or no additional boost is desirable, then the method continues at the control block 1140. The control block 1140 uses control logic to determine, for example, parameters germane to boost and geometry and/or electric assist power. As shown, the control logic block 1140 communicates information to a geometry block 1144 and/or a motor block 1148. According to an exemplary scenario, the geometry block 1144 sets geometry of a variable geometry unit for maximum flow and/or the motor block 1148 powers an electric assist unit, as appropriate. A decision block 1152 follows wherein a decision is made as to whether a boost target has been achieved through actions of the control logic 1140, the geometry adjustment 1144, and/or the power delivery 1148. If the decision block 1152 indicates that the target was achieved, then the exemplary method 1100 continues in another adjust geometry block 1156 and a power down block 1160. Typically, power is reduced to, for example, approximately zero and/or the geometry adjusted to maintain an appropriate boost. The adjust geometry block 1156 and the power down block 1160 typically continue at the reception block 1108.

If the decision block 1152 determines that the target boost has not been achieved, then the exemplary method 1100 continues at the control logic block 1140, wherein, for example, control logic optionally determines one or more new control parameters based, in part, on the indication that the target boost was not achieved.

In the case that the decision block 1128 determines that more boost is not desirable (e.g., that boost is sufficient or no boost is needed), then a control logic block 1170 follows wherein control logic is used to determine appropriate control parameters based, at least in part, on the determination that no additional boost is needed and/or a reduction in boost is desirable. The control logic block 1170 communicates control information, for example, to an adjust geometry block 1174 and/or a generator "on" block 1176. These two blocks 1174, 1176 typically act to maintain a desired boost and/or to reduce boost (e.g., in either instance a target boost or boost function). For example, the generator "on" block 1176 optionally activates a generator feature of an electric assist unit which causes a reduction in boost and/or extracts energy from a turbocharger system. The adjust geometry block 1174 and the generator "on" block 1176 continue at a decision block 1178 wherein the exemplary method 1100 determines whether the target boost has been achieved. If the target boost has not been achieved, then the exemplary method 1100 continues at the control logic block 1170. The control block 1170 optionally uses the decision of the decision block 1178 to determine new control parameters. Alternatively, the exemplary method 1100 continues at the reception block 1108.

The exemplary method 1100 optionally monitors power level in an electrical system of, for example, a vehicle to determine if extra power is needed. The exemplary method 1100 optionally operates in an effort to meet this need through use of a generator associated with an electric assist unit. For example, where electric assist boost is not required, the exemplary method 1100 optionally actuates a generator associated with an electric assist unit if needed. The exemplary method 1100 includes a variety of exemplary provisions for different operation conditions. Of course, any particular method may use none, one or more of these exemplary provisions and/or other provisions.

Figure 12:
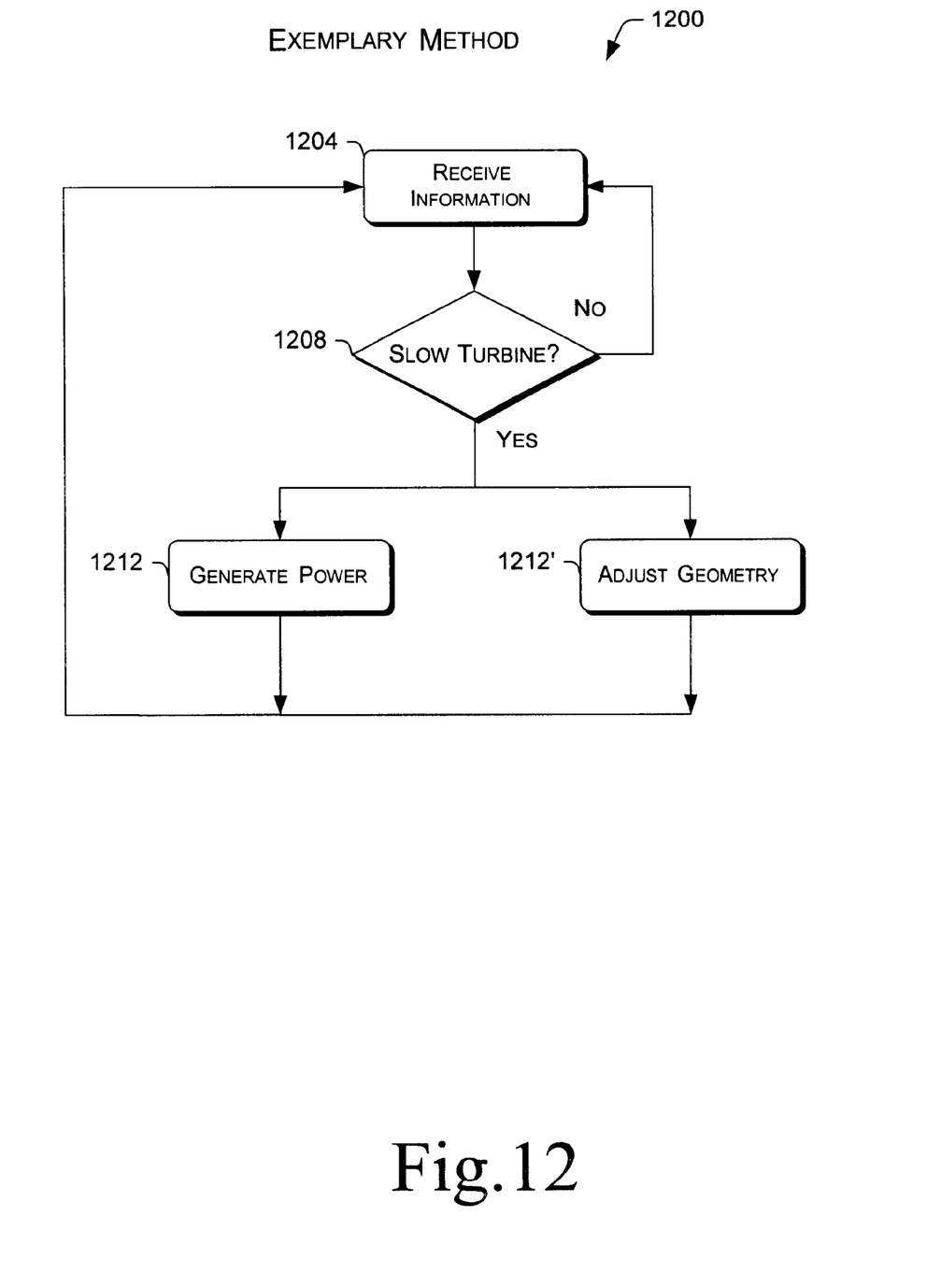
FIG. 12 is a block diagram illustrating an exemplary method for slowing a turbine.

Referring to FIG. 12, an exemplary method 1200 of slowing a turbine is shown. In a reception block 1204, a controller receives information pertaining to operation of an internal combustion engine having a variable geometry unit (e.g., VGT, nozzle(s), vane(s), etc.) and an electric assist unit (e.g., motor and/or generator). In a decision block 1208, the controller determines, based at least in part on the information, whether slowing of the turbine is appropriate. If the decision block 1208 determines that slowing is appropriate, then in a generation block 1212 and/or a geometry adjustment block 1212', the controller effectuates control to cause the electric assist unit to generate power (e.g., electrical power, shunt to resistor, etc.) and/or to adjust geometry of the variable geometry turbocharger to thereby slow the turbine. An exemplary method uses an exemplary electric assist unit to generate AC power which is optionally rectified to DC power. Power derived from an exemplary electric assist unit is optionally stored and/or used to power an electrical system (e.g., optionally used as an alternator, etc.).

While various exemplary systems and/or methods are shown individually in various figures, yet other exemplary systems and/or method optionally implement a combination of features. For example, an exemplary control system and/or method optionally implements features to boost combustion gas pressure and/or mass flow and/or slow a turbine. Of course, various exemplary systems and/or method may optionally use more than one electric assist device, variable geometry unit, turbine and/or compressor.

Although some exemplary methods, devices and systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A controller for controlling intake charge pressure to an internal combustion engine, the controller comprising:

control logic means for determining one or more control parameters based at least partially on a intake charge target pressure; and output means for outputting the one or more control parameters to control an electric motor operatively coupled to a compressor capable of boosting intake charge pressure, to control a generator, the generator operatively coupled to the turbine, and to control a variable geometry actuator capable of adjusting exhaust flow to a turbine.

2. A controller for controlling intake charge pressure to an internal combustion engine, the controller comprising:

control logic to determine one or more control parameters based at least partially on a intake charge target pressure; and one or more outputs to output the one or more control parameters to control an electric motor operatively coupled to a compressor capable of boosting intake charge pressure, to control a generator, the generator operatively coupled to the turbine, and to control a variable geometry actuator capable of adjusting exhaust flow to a turbine.

3. The controller of claim 2, wherein the control logic includes use of a mass fuel flow to the internal combustion engine and/or a rotational speed of the internal combustion engine.

4. The controller of claim 2, wherein the intake charge target pressure corresponds to a mass air flow.

5. The controller of claim 2, wherein the control logic includes use of a mass air flow to the internal combustion engine.

6. The controller of claim 5, wherein the control logic includes use of the mass air flow in one or more closed control loops.

7. The controller of claim 2, wherein the control logic includes one or more closed control loops.

8. The controller of claim 7, wherein the one or more closed control loops include a closed loop to control the electric motor and/or a closed loop to control the geometry actuator.

9. The controller of claim 2, wherein the control logic includes use of an operation function.

10. The controller of claim 9, wherein the operation function pertains to operation of the electric motor as a function of time.

11. The controller of claim 2, wherein the electric motor optionally operates as the generator.

12. A method for controlling intake charge pressure to an internal combustion engine, the method comprising:

determining one or more control parameters based at least partially on an intake charge target pressure; and outputting the one or more control parameters to control an electric motor operatively coupled to a compressor capable of boosting intake charge pressure, to control a generator, the generator operatively coupled to the turbine, and to control a variable geometry actuator capable of adjusting exhaust flow to a turbine.

13. The method of claim 12, wherein the determining includes use of a mass fuel flow to the internal combustion engine and/or a rotational speed of the internal combustion engine.

14. The method of claim 12, wherein the intake charge target pressure corresponds to a mass air flow.

15. The method of claim 12, wherein the determining includes use of a mass air flow to the internal combustion engine.

16. The method of claim 15, wherein the determining includes one or more closed control loops.

17. The method of claim 12, wherein the determining includes one or more closed control loops.

18. The method of claim 17, wherein the one or more closed control loops include a closed loop for controlling the electric motor and/or a closed loop for controlling the geometry actuator.

19. The method of claim 12, wherein the determining includes use of an operation function.

20. The method of claim 19, wherein the operation function pertains to operation of the electric motor as a function of time.

21. The method of claim 12, wherein the electric motor optionally operates as the generator.

22. The method of claim 12, further comprising achieving the target pressure.

23. One or more computer-readable media having computer-readable instructions thereon which, when executed by a programmable device, perform the method of claim 12.

24. A controller for controlling intake charge pressure to an internal combustion engine, the controller comprising:
control logic means for determining one or more control parameters based at least partially on a intake charge target pressure wherein the control logic means includes use of an operation function that pertains to operation of an electric motor as a function of time; and
output means for outputting the one or more control parameters to control the electric motor operatively coupled to a compressor capable of boosting intake charge pressure and to control a variable geometry actuator capable of adjusting exhaust flow to a turbine.

25. A controller for controlling intake charge pressure to an internal combustion engine, the controller comprising:
control logic to determine one or more control parameters based at least partially on a intake charge target pressure wherein the control logic includes use of an operation function that pertains to operation of an electric motor as a function of time; and
one or more outputs to output the one or more control parameters to control the electric motor operatively coupled to a compressor capable of boosting intake charge pressure and to control a variable geometry actuator capable of adjusting exhaust flow to a turbine.

26. The controller of claim 25, wherein the control logic includes use of a mass fuel flow to the internal combustion engine and/or a rotational speed of the internal combustion engine.

27. The controller of claim 25, wherein the intake charge target pressure corresponds to a mass air flow.

28. The controller of claim 25, wherein the control logic includes use of a mass air flow to the internal combustion engine.

29. The controller of claim 28, wherein the control logic includes use of the mass air flow in one or more closed control loops.

30. The controller of claim 25, wherein the control logic includes one or more closed control loops.

31. The controller of claim 30, wherein the one or more closed control loops include a closed loop to control the electric motor and/or a closed loop to control the geometry actuator.

32. The controller of claim 25, wherein the one or more outputs includes an output to output a control parameter to control a generator, the generator operatively coupled to the turbine.

33. The controller of claim 32, wherein the electric motor optionally operates as the generator.

34. A method for controlling intake charge pressure to an internal combustion engine, the method comprising:
determining one or more control parameters based at least partially on an intake charge target pressure wherein the determining includes use of an operation function that pertains to operation of an electric motor as a function of time; and
outputting the one or more control parameters to control the electric motor operatively coupled to a compressor capable of boosting intake charge pressure and to control a variable geometry actuator capable of adjusting exhaust flow to a turbine.

35. The method of claim 34, wherein the determining includes use of a mass fuel flow to the internal combustion engine and/or a rotational speed of the internal combustion engine.

36. The method of claim 34, wherein the intake charge target pressure corresponds to a mass air flow.

37. The method of claim 34, wherein the determining includes use of a mass air flow to the internal combustion engine.

38. The method of claim 37, wherein the determining includes one or more closed control loops.

39. The method of claim 34, wherein the determining includes one or more closed control loops.

40. The method of claim 39, wherein the one or more closed control loops include a closed loop for controlling the electric motor and/or a closed loop for controlling the geometry actuator.

41. The method of claim 34, wherein the outputting outputs a control parameter to control a generator operatively coupled to the turbine.

42. The method of claim 41, wherein the electric motor optionally operates as the generator.

43. The method of claim 34, further comprising achieving the target pressure.

44. One or more computer-readable media having computer-readable instructions thereon which, when executed by a programmable device, perform the method of claim 34.

* * * * *